Jan. 17, 1928. 1,656,819

W. FETZ

END MATCHER TRIM GAUGE FOR SAWS

Filed Aug. 10, 1926

Werner Fetz Inventor

By John W. Farley Attorney

Patented Jan. 17, 1928.

1,656,819

UNITED STATES PATENT OFFICE.

WERNER FETZ, OF MEMPHIS, TENNESSEE, ASSIGNOR TO E. L. BRUCE COMPANY, OF MEMPHIS, TENNESSEE, A CORPORATION OF DELAWARE.

END-MATCHER TRIM GAUGE FOR SAWS.

Application filed August 10, 1926. Serial No. 128,431.

This invention relates to gauges for end matcher saws, and has for its object to provide a device of this character whereby as pieces of materials, for instance flooring, are fed towards the saw, said pieces of material are moved longitudinally inwardly to a position where they will be engaged by the saw relatively close to the ends of the pieces, thereby reducing the amount of material cut from the flooring to a minimum, and obviating waste.

A further object is to provide a guide bar against which the ends of the pieces of flooring slidably engage as they are fed towards the saw, and the guide bar with a roller which engages the ends of the pieces of flooring adjacent the saw for moving said pieces of flooring inwardly to a position where a minimum amount of cut will be taken therefrom by the saw. The roller forms a rolling engagement with the end of the board whereby said roller will roll out of engagement with the guide thereby obviating frictional engagement with the guide during the sawing operation and preventing splitting or shattering of the end of the board.

A further object is to provide the guide bar with an inwardly extending angular portion on which the roller is mounted, and which angular portion engages the ends of the boards as they are fed towards the saw, thereby moving said boards longitudinally to a position where they will be engaged by the saw relatively close to the ends of the boards thereby insuring a minimum amount of cut from the ends of the board and reducing waste of material to a minimum.

A further object is to provide the angular portion of the guide bar with a bifurcation in which is rotatably mounted a board engaging roller, and which roller is disposed adjacent the same. Also to provide the edge of the roller of a thickness less than the groove of a board whereby it will not jam in the groove of the board and cause splitting or shattering of the opposite sides thereof.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1:
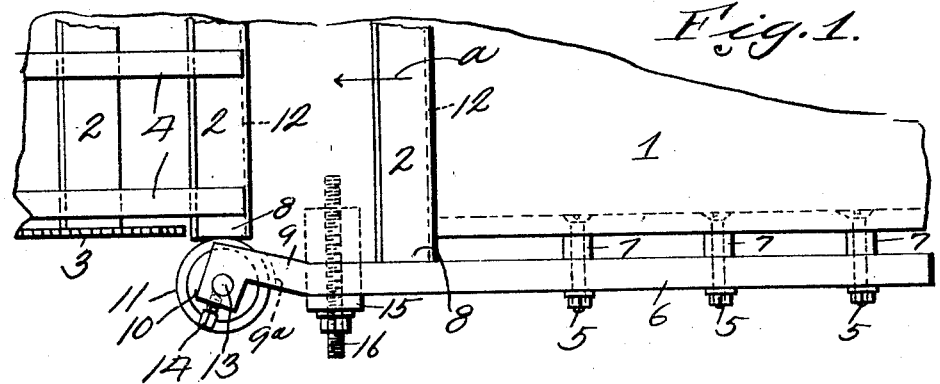
Figure 1 is a top plan view of a conventional form of matching machine, showing the gauge applied thereto.

Referring to the drawing, the numeral 1 designates the table of a sawing machine, over which table boards 2 are moved by any suitable mechanism and in the direction of the arrow $a$, and towards the saw 3 and presser arms 4. The boards 2 are preferably flooring boards which are of various lengths when fed to the machine, and which machine feeds the same towards the cut off saw 3, and from which machine the boards pass to mechanism which places a tongue on one end and a groove on the other end of the board, therefore it will be seen that it will be necessary for the ends of the boards 2 to be square before the tongue and groove operation, and at the same time in the squaring up operation it is necessary for the minimum amount of material to be cut from the ends of the board to obviate waste, which can be readily appreciated when it is considered that many thousands of lineal feet of board are passed through a machine of this character in the course of a day.

Secured to the side of the table 1 by means of bolts 5 is a horizontally disposed guide bar 6, which guide bar is in parallel relation to the cut off saw 3, and held in spaced relation to the table 1 by means of sleeves 7, which sleeves may be varied in length for varying the distance of the guide bars 6 from the saw 3. The ends of the boards 2, as they move in the direction of the arrow $a$, are in engagement with the inner side of the guide bar 6, and as the boards approach the cut off saw 3, as they are fed towards said saw, the ends 8 thereof engage the inwardly inclined arm 9, and which arm 9 causes the boards 2 to be moved longitudinally inwardly as they are fed towards the cutoff saw. Rotatably mounted in a bifurcation 10 of the arm 9 is a horizontally disposed roller 10, which roller is finally engaged by the end of the board as it reaches the saw 3, and which engagement imparts the final inward movement on the board and positions the end 8 thereof where the minimum amount of material will be cut therefrom by the cut-off saw 3 during the squaring of the end of the board as clearly shown in Figure 1. The roller 10 has its outer edge 11 relatively thin and preferably narrower than the width of the grooves 12 in the boards whereby said roller will not bind or frictionally engage in the grooves 12 during the passage of the boards over the roller, thereby preventing spreading of the walls of the grooves and shattering of said walls. The roller 10 is rotatably mounted on a vertically disposed pin 13, which extends through the arm 9, and which pin is held in position by means of set screws 14. Extending upwardly adjacent the outer side of the guide bar 6 is a bracket 15, which bracket is connected to the guide bar 6 in any suitable manner and adjusted inwardly and outwardly by means of an adjusting screw 16, however the bracket 15 braces the guide bar 6 adjacent the saw and adjacent the inclined portion thereof, thereby preventing outward movement or springing of the bar, and at the same time in combination with the bolts 5 and the removable sleeve 7, allows an inward and outward adjustment of the gauge and guide. Rollers 10 may vary in thickness according to the size of material that is passed through the device and by providing the removable pin 13 and set screws 14 the rollers may be easily and quickly changed.

Figure 2:
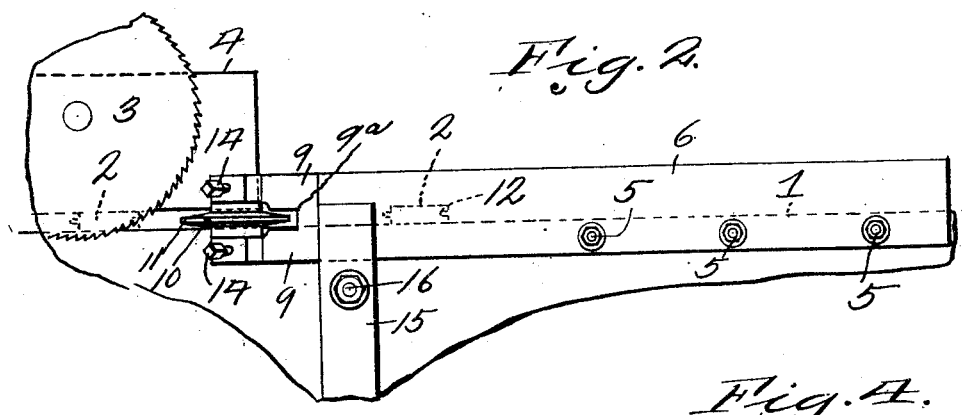
Figure 2 is a side elevation of the gauge.
Figures 3, 4, 5:
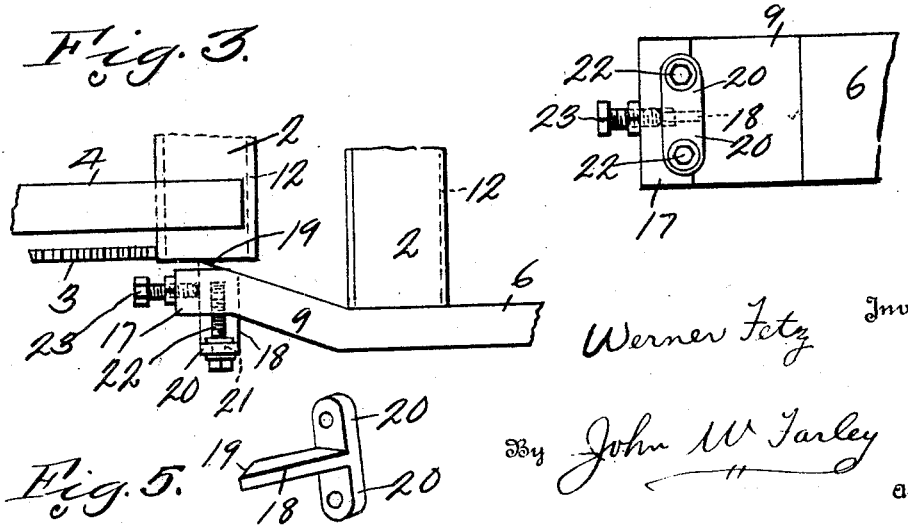
Figure 3 is a detail plan view of a modified form of gauge showing an adjustable board engaging member carried thereby.
Figure 4 is a side elevation of the gauge shown in Figure 3.
Figure 5 is a perspective view of the gauge members shown in Figures 3 and 4.

Referring to Figures 3 to 5 inclusive, the construction and operation of the modified form is substantially the same as shown in Figures 1 and 2, with the exception the roller 10 is eliminated, and the arm 9 provided with an extension 17 in parallel relation to the guide arm 6, and extending the arms 9 and 7 is a horizontally disposed board engaging member 18, which board engaging member is provided with an end 19 in the plane of the inner side of the arm 9, and projects beyond the arm 17 and slidably engages the end of the board 2 as it is fed to the saw 3. Member 18 is preferably thinner than the groove 12 of the board for preventing splitting of the walls of the groove. The board engaging member at its outer end is provided with upwardly and downwardly extending arms 20, in which are rotatably mounted at 21 adjusting screws 22, and it will be seen by adjusting the screws 22, the member 18 may be adjusted inwardly and outwardly for accurately positioning the outer ends 19 thereof in relation to the saw 3, and to the arm 9, otherwise the construction and operation is substantially the same as shown in Figures 1 and 2.

From the above it will be seen that guiding means is provided cooperating with the ends of boards for moving the same inwardly as said boards are fed towards a cutoff saw, which saw squares the ends of the boards, and by moving the boards longitudinally inwardly they are positioned where the minimum amount of material will be severed from the ends thereof thereby reducing the waste of material to a minimum.

A set screw 23 is provided for holding the member 18 in adjusted position after an adjustment thereof through the medium of the bolts 22.

The invention having been set forth what is claimed as new and useful is:—

1. In a sawing machine, a table, a saw at one end of the table, and means adapted to engage a tongue and groove board lying crosswise of the table to guide it into position to have one end trimmed by the saw said means comprising a guide inclined toward the saw, and final guiding means narrower than such tongue or groove.

2. In a sawing machine, a table, a saw at one end of the table, means adapted to engage a tongue and groove board lying crosswise of the table to guide it into position to have one end trimmed by the saw said means comprising a guide inclined toward the saw, and final guiding means narrower than such tongue or groove said final guiding means being carried by the inclined part of said guide and adjustable toward and from the plane of the saw independently of said guide.

3. In a sawing machine, a table, a saw at one end of the table, and means adapted to engage tongue and groove boards lying crosswise of the table to guide them into position to have one end trimmed by the saw said means comprising a guide inclined toward the saw, and a roller at the end of said guide next the saw for giving the boards a final endwise movement, said roller being narrower than the tongue or groove.

In witness whereof I have affixed my signature.

WERNER FETZ.